April 11, 1939.　　　A. W. TONDREAU　　　2,153,902

APPARATUS FOR MAKING ANIMATED CARTOONS

Filed July 5, 1935　　　5 Sheets-Sheet 3

INVENTOR.
ALBERT W. TONDREAU
BY
ATTORNEY.

April 11, 1939.　　　A. W. TONDREAU　　　2,153,902
APPARATUS FOR MAKING ANIMATED CARTOONS
Filed July 5, 1935　　　5 Sheets-Sheet 4

INVENTOR.
ALBERT W. TONDREAU
BY W. E. Beatty
ATTORNEY.

April 11, 1939. A. W. TONDREAU 2,153,902
APPARATUS FOR MAKING ANIMATED CARTOONS
Filed July 5, 1935 5 Sheets-Sheet 5

INVENTOR.
ALBERT W. TONDREAU
BY
ATTORNEY.

Patented Apr. 11, 1939

2,153,902

UNITED STATES PATENT OFFICE 2,153,902

APPARATUS FOR MAKING ANIMATED CARTOONS

Albert W. Tondreau, Hollywood, Calif., assignor to Warner Bros. Pictures, Inc., New York, N. Y., a corporation of Delaware Application July 5, 1935, Serial No. 29,789

13 Claims. (Cl. 88—16)

This invention relates to apparatus for photographing animated cartoon drawings upon a motion picture film.

In this type of photography, a large number of drawings are made, each differing only slightly from its preceding drawing. These drawings are then photographed in their proper sequence upon a film which, when projected in the usual manner, will show movement of the object or objects depicted on the drawings.

Usually, pictures of this type comprise one or more objects which move in relation to a background. The background is in most cases drawn or painted on a sheet much longer than the picture to be photographed. The objects which are to be represented as moving are drawn upon a series of separate transparent sheets, usually of Celluloid. The areas within the outlines of the objects are made opaque such as by the use of solid paint on the bottom side of the celluloid sheet to prevent the background from showing through the object. The cartoons are then photographed in their proper sequence in superposed relation with the background strip.

One object of the present invention is to move a plurality of cartoon drawings relative to each other and in a predetermined relation.

This is accomplished by providing a table having thereon a series of cartoon carriers which are independently movable in relation to each other. One of the cartoon carriers is placed so as to move a cartoon in a transverse direction in respect to the other carriers. To insure a predetermined relation between the various cartoons, scales and indexing devices are provided.

Another object of the invention is to prevent blurring or halation of the cartoons.

This is accomplished by providing a presser plate of glass or other transparent rigid material which is clamped upon the cartoon drawing by a pressure device controlled by the operator. Preferably a fluid operated plunger is employed having a valve cooperating therewith for controlling its operation.

During the process of photographing an entire animated cartoon serial, a greater or less number of superposed transparent cartoon drawings may be used at each photographic exposure. That is, for example, only one Celluloid sheet may be used in one scene while in a second scene, three or four may be used. The result is that the photographing of a large number of cartoon sheets in superposed position will require a stronger amount of light than when only one or two sheets are used, due to the density of each of the Celluloid sheets.

Heretofore, this change in light intensity has been achieved by providing a rheostat in the lamp circuit. This requires a rather delicate adjustment and also necessitates calibration of the rheostat for different numbers of sheets thus allowing for errors in adjustment of the lamp current. It therefore becomes a further object of my invention to keep the photographic exposure intensity the same for different numbers of superposed Celluloid sheets used.

This is accomplished by superposing blank Celluloid sheets or other transparent material having an appreciable amount of density on these sets of drawings in which the scene to be photographed requires only a small number of transparent cartoon sheets. In using the same material throughout, i. e., Celluloid, the photographic exposure intensity may be maintained at the same value for each series of scenes by keeping the number of sheets the same. That is, in scenes employing only a few transparent drawings, blank sheets are added until the total number is the same as for other series. This constitutes a quick and accurate method of regulating the photographic exposure intensity so that it will remain the same in all scenes. Obviously, this method may also be used to vary the photographic exposure intensity as desired.

A still further object of my invention is to adjust the position of the cartoons in respect to the optical axis of the camera.

This is accomplished by providing means to rotate the cartoon supporting table about an axis parallel to the optical axis of the camera. Also, the table may be adjusted angularly in respect to the movement of the cartoon carriers and in the same plane thereof to give various effects.

A further feature of the invention resides in a focusing device cooperating with the camera which may be conveniently viewed by the operator while the camera is placed in an awkward position.

Provision is also made to retain one or more transparent sheets, either blank or having picture parts thereon against the presser plate to obviate handling of these sheets at each exposure.

Other objects and features of the invention will be more apparent from the accompanying detailed description and drawings. Referring now to the drawings.

Fig. 16 is a side elevational view of the cartoon table column and is taken in the direction of the arrow 16, Fig. 2.

Figure 1:
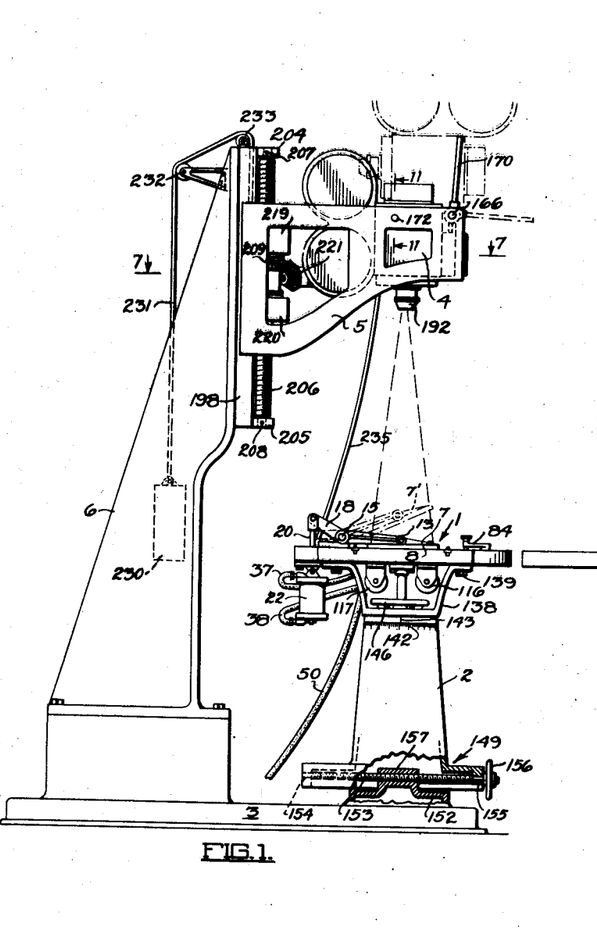
Fig. 1 is a side elevation view of an animated cartoon machine constructed in accordance with this invention.
Figure 2:
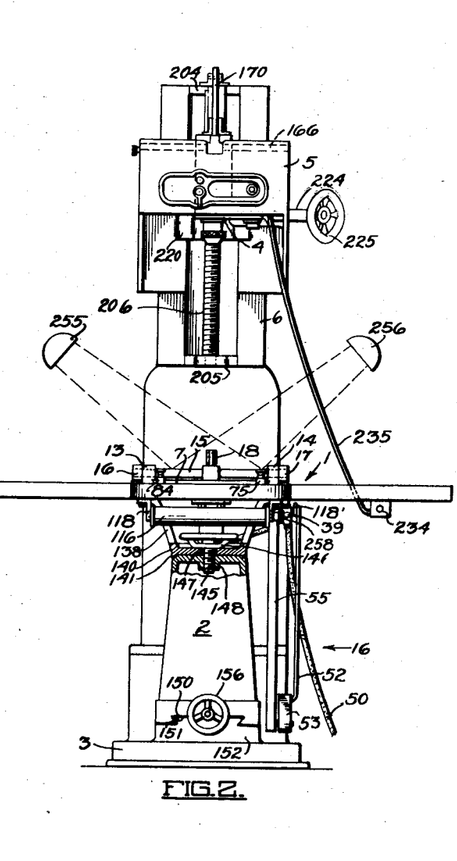
Fig. 2 is a front elevation view of the animated cartoon machine.

More particularly referring to Figs. 1 and 2, a cartoon carrying table generally indicated at 1 is mounted upon a column 2 which in turn is supported upon a bed 3. A motion picture camera 4 is supported directly above the table 1 within a camera support 5. The support 5 is slidably mounted upon a standard 6 which is also secured at its lower end upon the bed 3.

Figure 3:
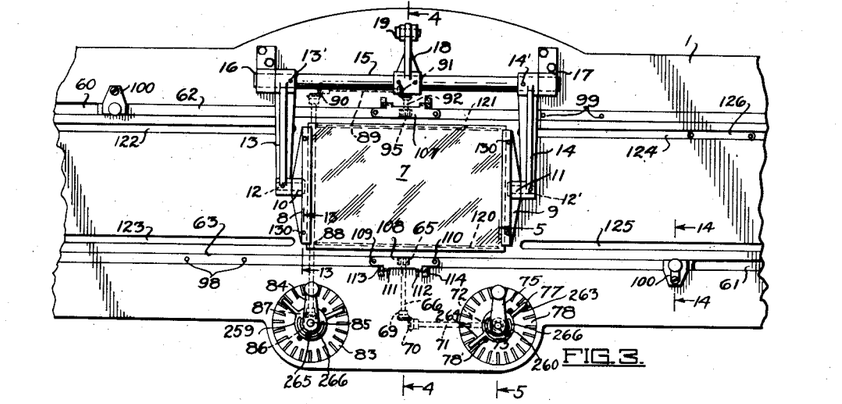
Fig. 3 is a plan view of the cartoon carrying table with parts broken off.
Figure 4:
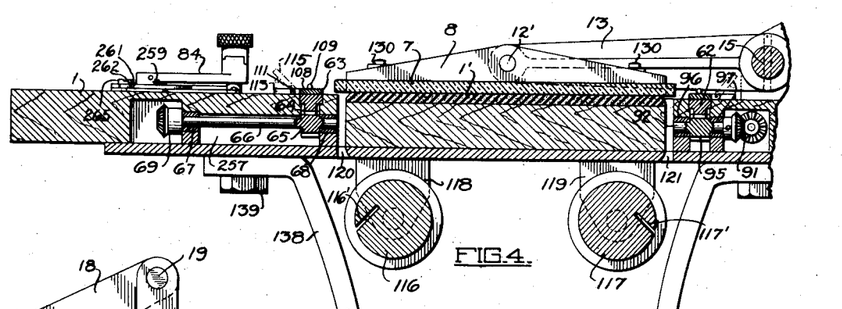
Fig. 4 is a transverse sectional view through the cartoon table and is taken along the line 4—4 of Fig. 3.
Figure 6:
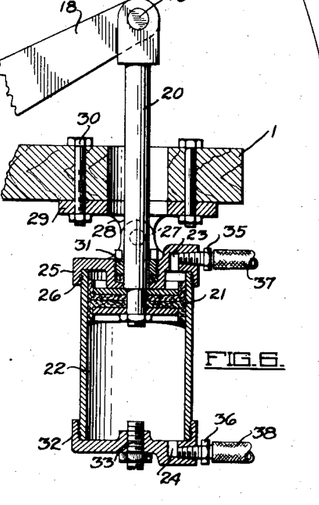
Fig. 6 is a sectional view taken through the presser plate operating plunger.
Figure 17:
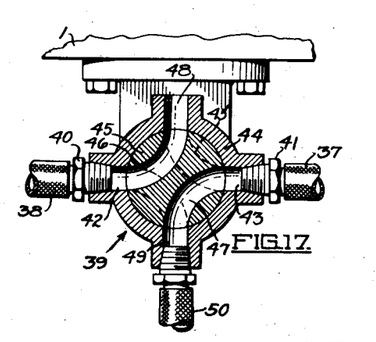
Fig. 17 is a sectional view through the four-way valve adapted to operate the presser plate operating plunger.

Referring now to Figs. 3 and 4, a presser plate 7 is provided at the center of the table 1 to clamp the cartoons in position upon a rubber pad 1' and prevent halation due to wrinkling of the Celluloid sheets. The ends of the plate 7 are secured within end braces or frames 8 and 9. Bearings 10 and 11 provided at the central portions of the braces 8 and 9 are journaled upon pins 12 and 12' mounted at the outer ends of a pair of arms 13 and 14. The other ends of the arms 13 and 14 are rigidly mounted as by pins 13' and 14' upon a cross shaft 15 which is journaled in bearings 16 and 17 secured to the upper surface of the table 1. A third arm 18 also rigidly secured to the shaft 15 is connected at its outer end as by pin 19, Fig. 6, to a plunger rod 20 having at its lower end a plunger or piston 21. Piston 21 works within a cylinder 22 having at its upper and lower ends cylinder heads 25 and 32. The upper cylinder head 25 of the cylinder 22 is threadably secured thereto as at 26 and has a pair of diammetrically disposed ears 27 which are pivotally mounted to similar ears 28 provided on a hollow bracket 29 which is secured as by bolts 30 to the under surface of the table 1. A packing gland 31 is provided on the cylinder head 25 to prevent leakage of air along the sides of the plunger rod 20. The lower cylinder head 32 is also threadably secured to the cylinder 22 and has a stop screw 33 at its central portion which may be adjusted to limit the downward stroke of the piston 21. Nipples 35 and 36 are threadably secured within the cylinder heads 25 and 32 and communicate with openings 23 and 24. Air hoses 37 and 38 are secured to the nipples 35 and 36. The other ends of the hoses 37 and 38 communicate with a four-way valve generally indicated at 39 (Fig. 17). Nipples 40 and 41 carried by the ends of the hoses 37 and 38 are threadably secured within diametrically opposed openings 42 and 43 provided within a valve casing 44. A rotatable valve 45 within the casing 44 has a pair of arcuate passages 46 and 47 therein. The openings 46 and 47 are adapted, in one position of the valve, to connect the passages 42 and 43 with similar passages 48 and 49, respectively, provided at right angles thereto. Passage 48 is open at its outer end to allow for escape of air from either of the hoses 37 or 38 depending upon the position of the valve 45. The passage 49 communicates with a supply hose 50 which is connected to any suitable source of air pressure, not shown, such as a pump or pressure tank. As will be seen in Fig. 17, the passage 47 (in this position of the valve 45) supplies air to the hose 37 and thus to the upper portion of the cylinder 22. Rotation of the valve 45 to a position at 90 degrees from its original position, as indicated by the dotted lines 45', will allow the air from the upper portion of the cylinder 22 to be expelled into the atmosphere and at the same time admit air under pressure from the hose 50 into the lower portion of the cylinder 22 through the hose 38. Thus it will be seen that the plunger rod 20 may be positively moved in either an upward or downward direction to hold the presser plate 7 in an engaged or disengaged position. Rotation of the valve 45 is accomplished through a lever 51 secured thereto as shown in Fig. 16. The other end of lever 51 is pivotally secured to a rod 52 pivotally mounted upon the free end of a foot pedal 53. Pedal 53 is hinged at 54 to the lower end of a column 55. The upper end of the column 55 has a flange 56 secured thereon through which the column 55 is supported by bolts 56' to the lower surface of the table 1. A tension spring 57 attached between the pedal 53 and a point intermediate the ends of the standard 55 tends to hold the pedal 53 in an upward position and thus keep the presser plate 7 in the disengaged position 7' shown in Fig. 1. When the pedal 53 is depressed by the operator, the valve 45 is rotated into the position shown by the dotted lines of Fig. 17 thus causing the plunger rod 20 to be raised, holding the presser plate 7 in the full line position shown in Fig. 1.

Figure 5:
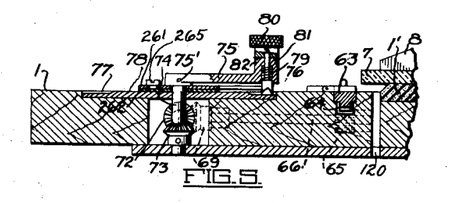
Fig. 5 is a sectional view through the indexing arrangement and is taken along the line 5—5 of Fig. 3.
Figure 14:
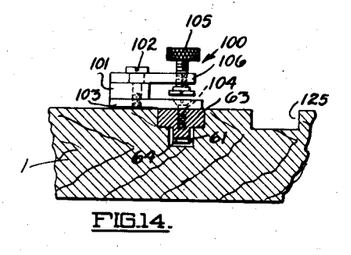
Fig. 14 is a sectional view taken along the line 14—14 of Fig. 3 showing means for clamping a cartoon strip upon a cartoon carrier.

Channels 60 and 61 (Fig. 3) provided on the upper surface of the table 1 have cartoon carrying slides or carriers 62 and 63 slideably mounted therein. Each of the slides 62 and 63 has formed at its bottom surface a gear rack 64 (Figs. 4, 5, and 14). The rack teeth of the slide 63 are adapted to be meshed by a small spur gear 65 provided on the end of a shaft 66 (Fig. 4). Shaft 66 is journaled within bearings 67 and 68 mounted within a cavity 257 formed in the bottom of the table 1, and has a bevel gear 69 at its opposite end which meshes with a similar gear 70 (Fig. 3) at the end of a second shaft 71. A bevel gear 72 at the end of the shaft 71 meshes within another bevel gear 73 (Fig. 5) provided on a vertical stub shaft 74. A handle 75 is rigidly secured as by pin 75' to the upper surface of the shaft 74 and carries at its outer end a plunger 76. The lower end of the plunger 76 has a wedge-shaped point which is adapted to be engaged within any one of a number of radially extending notches 77 provided in an indexing plate 78. Screws 78' securely hold the plate 78 within a recessed portion of the table 1. A compression spring 79 urges the plunger 76 in a downward position. A knob 80 secured to the upper end of the plunger 76 has a lip 81 at one side thereof which normally rests in a similarly shaped detent provided on a projection 82 of the handle 75. In the event that the operator does not wish to employ the plunger 76 for obtaining an indexing movement, knob 80 may be raised until the lip 81 is above the upper surface of the projection 82 and then rotated, thus allowing the lower edge of the lip 81 to rest on the surface of the projection 82 and hold the plunger 76 out of engagement with the indexing plate 78. A second indexing plate 83 (Fig. 3) is provided adjacent the plate 78 and is identical thereto. A handle 84 similar to the handle 75 is secured to the upper portion of a stub shaft 85 having a bevel gear 86 at its lower end which meshes with a second bevel gear 87 provided on the end of a laterally extending shaft 88. Rotation of the shaft 88 causes a similar rotation of a second shaft 89 through a bevel gear arrangement 90. A second bevel gear arrangement 91 transmits motion to a third shaft 92 (Fig. 4) having a spur gear 95 thereon. Shaft 92 is journaled within bearings 96 and 97. From the above description, it will be seen that rotation of either of the handles 75 and 84 will cause a longitudinal movement of either of the slides 62 and 63, respectively, to thus move the cartoons attached to the slides 62 and 63 in a desired direction relative to each other.

Spacers 259 and 260 are provided on the indexing plates 78 and 83 to indicate the correct angular movement of the handles 75 and 84 for each setting. Each of the spacers 259 and 260 comprises a pair of disks 261 and 262 having apertures in the center thereof which fit over the shaft 74 or 85. Arms 263 and 264 project from the disks 261 and 262. The disks are clamped together by means of a screw 265 which passes through an arcuate slot 266 in the upper disk 261, and is threadably mounted in the lower disk 262. The angular position of the arms 263 and 264 in relation to each other may be adjusted by loosening the screw 265 and rotating one of the disks a desired amount in respect to the other. When the spacers 259 and 260 are used, the operator rotates the desired spacer until one of the arms (i. e., 263) is brought in contact with the plunger 76. The handle 75 or 84, whichever the case may be, is then rotated until the plunger contacts the arm 264 which will give the correct distance. To obtain the next setting, the spacer is again rotated until the arm 263 comes in contact with the plunger 76 and the handle 75 or 84 is then rotated as before until the plunger 76 comes in contact with the arm 264, etc.

Removable pins 98 and 99 inserted within holes provided in the slides 62 and 63 are adapted to be inserted within registering holes provided in the cartoons to thus hold the cartoons in an aligned position. In the event that either of the slides 62 or 63 is to be used to carry a background strip, clamps 100 (Fig. 14), provided at the opposite ends of each of the slides 62 and 63, may be used. Each of the clamps 100 comprises a U-shaped assembly 101 held together by a screw 102. The lower member 103 of the assembly 101 is secured to the upper surface of the slide 62 or 63 as by a screw 104. A knurled clamp screw 105 is threadably mounted through an upper cross member 106 and is adapted to clamp the cartoon strip upon the upper surface of the member 103.

In case any of the cartoons are to be held stationary while the slides 62 and 63 are moved, a pair of hinged members 107 and 108 (Figs. 3 and 4), provided at the center of the table 1, are used. Pins 109 and 110 project upward from the surface of each of the members 107 and 108 to engage registering holes provided in the cartoon sheets. Ears 111 and 112 at the back of each of the members 107 and 108 are pivotally mounted to ears 113 and 114 secured to the upper surface of the table 1. In the event that these members 107 and 108 are not to be used, they may be moved out of the way as shown by the dotted lines 115 of Fig. 4.

A pair of rollers 116 and 117 (Figs. 1, 2 and 4) are journaled at their ends within brackets 118, 118', 119, and 119' provided on the lower surface of the table 1. Slots 116' and 117' are provided longitudinally of the rollers 116 and 117 to secure the ends of a background strip in the event that a transversely moving background is employed. Vertical slots 120 and 121 provided in the table 1 allow the background strip to be fed from either of the rollers 116 or 117 upward and onto the upper surface of the table 1 and thence down onto the other of the rollers 116 and 117. Knobs 258 (Fig. 2) on the right hand ends of the rollers 116 and 117 are provided to allow for moving the background strip.

Figure 15:
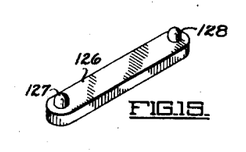
Fig. 15 is a perspective view of a cartoon holding slide.
Figure 19:
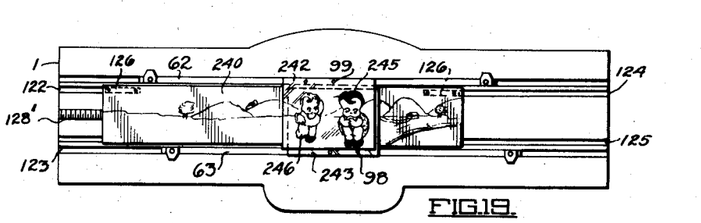

A second series of channels 122, 123, 124, and 125 (Fig. 3) are provided adjacent the channels 60 and 61 to receive slides 126 (Fig. 15). Pins 127 and 128 extending upward from the slides 126 are adapted to be engaged within registering holes provided in the cartoons or background strip. These slides 126 are adapted to be placed within either of the channels 122–125, inclusive, and may be indexed by means of scales 128' (Fig. 19).

Figure 13:
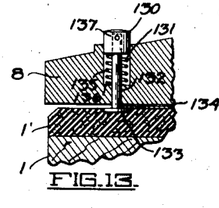
Fig. 13 is a sectional view showing one of the blank sheet retaining members and is taken along the line 13—13 of Fig. 3.

As was stated before, different scenes require a different number of superposed Celluloid sheets. Due to the fact that the density of each of the Celluloid sheets cuts down to some extent the intensity of the light projected upon the cartoons, it will be understood that in scenes where only a few Celluloid sheets are used, the photographic value will be much higher than in those in which a considerable number of sheets are used. In order to compensate for this increase in intensity, two methods may be used: either the intensity of the illumination may be increased, or the number of Celluloid sheets may be kept the same throughout the entire movement of scenes by adding a sufficient number of blank sheets. Due to the fact that control of the illumination is rather uncertain, the most desirable way to accomplish this is to employ the same number of Celluloid sheets at all times. For this purpose, I employ spring pressed retaining plungers 130 (Fig. 13) at either end of the braces 8 and 9. A counter-bored hole 131 receives a stem 132 of the plunger 130. The lower end of the stem 132 has an enlarged head 133 which is adapted to engage any number of blank Celluloid sheets as at 134 and hold them to the under surface of the presser plate 7. A compression spring 135 seated at one end against the shoulder 136 of the counter-bored hole 131 presses against a thumb piece 137 to hold the head 133 in clamping position.

Referring now to Figs. 1 and 2, the cartoon table 1 is supported upon its column 2 through a spider 138 which is secured to the lower surface of the table 1 through bolts 139. The bottom portion of the spider 138 is formed into an annular base 140 having a depending lip 141 which is seated upon a similarly shaped upper surface of the column 2. A scale 142 provided on the column 2 is adapted to register with an indexing line point 143 on the spider 138. A clamping screw 145 is passed through an aperture 147 in the central portion of the spider 138 and is threadably secured at 148 to the upper surface of the column 2.

The table 1 is adapted to be moved in a transverse direction by means of a dove-tailed slide arrangement generally indicated at 149. A dove-tailed slot 150 on the lower end of the column 2 is adapted to slide within a similarly shaped guideway 151 provided on a base 152 formed integrally with the bed 3. A screw 153 is journaled at its ends 154 and 155 within the column 2 and has securely mounted at its forward end a hand wheel 156. The screw 153 engages an internally threaded projection 157 forming part of the base 152.

Referring now to Figs. 1, 7, 8, and 9, the camera 4 is mounted upon a supporting plate 160 having dove-tailed surfaces 161 at the sides thereof. Plate 160 is adapted to slide within guide surfaces 162 provided within a casting 163. Casting 163 has a pair of upwardly extending lugs 164 and 165 having apertures therein which are fitted over a cross shaft 166. Pins 164' and 165' hold the casting 163 rigid upon the shaft 166. Shaft 166 is journaled within bearings 167 and 167' provided in the sides 168 and 169 of the camera support 5. A handle 170 is securely mounted to the central portion of the shaft 166 as by pin 171. Rotation of the handle 170 causes the camera 4 to be raised into a horizontal position to allow access to the film magazine of the camera 4 for threading. In order to hold the camera 4 in the threading position, a locking member 172 (Fig. 11) is provided. A plunger 173 is slidably mounted within a counter-bored hole 174 provided in a boss 175 formed integrally with side 168 of the support 5. A compression spring 176 forces the plunger 173 into an extended position. When the camera 4 is raised, the plunger 173 is retracted by means of a knob 177 provided on the end thereof to allow the camera 4 to pass thereby. The knob 177 is then allowed to retract allowing the under surface of the camera, as indicated by the dotted lines 178, to rest upon the upper surface of the extending portion of the plunger 173.

Figures 7, 10, 11:
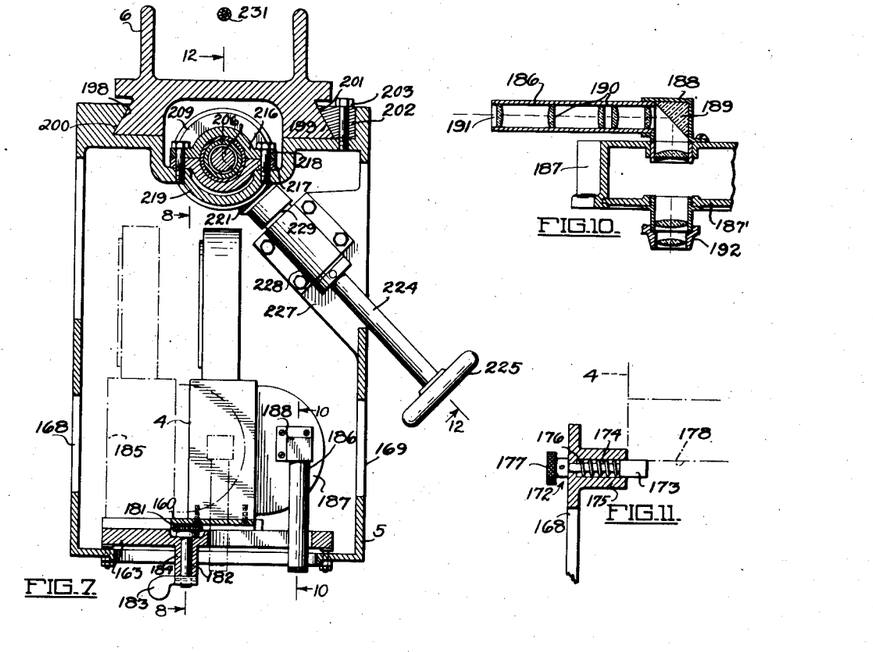
Fig. 7 is a sectional plan view of the camera support and is taken along the line 7—7 of Fig. 1.
Fig. 10 is a sectional view of the focusing arrangement for the camera and is taken along the line 10—10 of Fig. 7.
Fig. 11 is a sectional view of the lock which is adapted to hold the camera in a threading position and is taken along the line 11—11 of Fig. 1.
Figure 8:
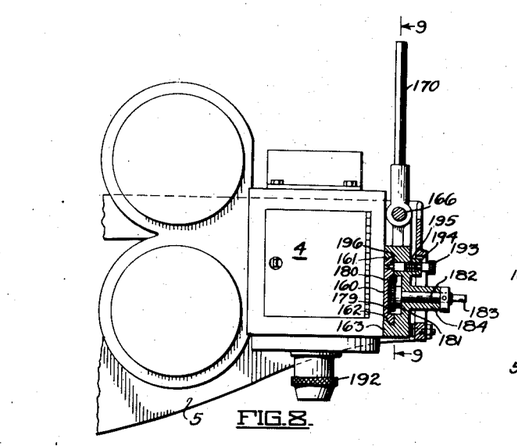
Fig. 8 is a sectional elevation view taken along the line 8—8 of Fig. 7.
Figure 9:
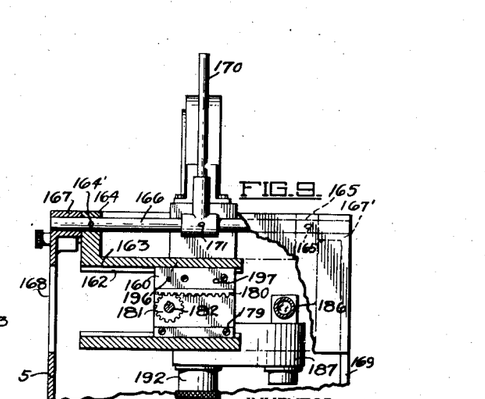
Fig. 9 is a sectional view taken along the line 9—9 of Fig. 8.

I will now describe the mechanism for focusing the camera 4 upon the cartoon table 1. The supporting plate 160 has a longitudinal groove 179 therein to which is secured at its upper portion a rack 180 (Figs. 8 and 9) which extends the entire length of the supporting plate 160. A spur gear 181 is secured to a stub shaft 182 and meshes with the rack 180. Shaft 182 has a handle 183 secured to its outer end and is journaled within a bearing 184 provided in the casting 163. Rotation of the handle 183 causes the camera 4 to be moved from photographing position into a focusing position or vice versa as indicated by the dotted lines 185 (Fig. 7). Focusing of the camera is accomplished by means of a focusing tube 186 (Figs. 7 and 10). The turret support 187 of the camera 4 carries a prism holder 188 in which is mounted a prism 189. The focusing tube 186 is also supported by the prism holder 188 and contains a series of lenses 190 and an eye-piece 191. The objective lens 192 mounted in a rotatable turret 187' is adapted to be moved into alignment with the prism 189 when focusing, to allow the image of the cartoon picture to be reflected into the focusing tube 186 where it may be received by the operator. A stop 193 (Fig. 8) is provided to insure correct positioning of the camera 4 in photographing and focusing positions and consists of a spring pressed plunger 194 provided within a counter-bored hole 195 formed within the casting 163. Plunger 194 is adapted to be engaged within either of a pair of holes 196 and 197 (Fig. 9).

Figure 12:
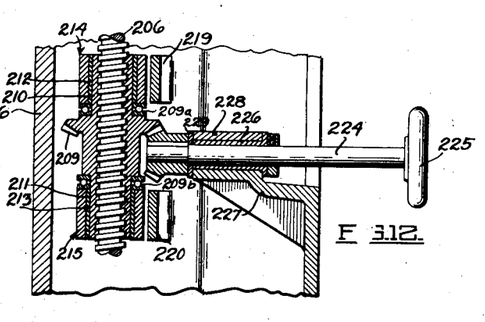
Fig. 12 is a fragmentary sectional view of the camera raising mechanism and is taken along the line 12—12 of Fig. 7.

When the camera is to be focused, the plunger 194 is withdrawn and the handle 183 is rotated so as to throw the camera 4 into the focusing position shown by the dot and dash lines 185 (Fig. 7) at which time the plunger will engage the hole 197. The turret 187' is rotated until the objective lens 192 is brought into alignment with the prism 189. The camera is then focused in the usual manner by viewing the cartoon table 1 through the eye piece 191 and rotating the lens 192 until the image is in sharp focus. When this is accomplished, the plunger 194 is again retracted and the camera thrown over to its photographing position. At the same time, the turret 187' is revolved to bring the lens 192 into alignment with the photographing aperture of the camera 4. The support 5 has a pair of vertical dove-tailed surfaces 198 and 199 at its rear end which are adapted to engage a pair of dove-tailed surfaces 200 and 201 provided on the forward edge of the standard 6. The surface 199 is formed by a strip 202 which is secured to the support 5 by bolts 203. A pair of lugs 204 and 205 (Fig. 1) project from the standard 6 adjacent the upper and lower ends of the dove-tailed guides 198 and 199 and have secured thereto, as by pins 207 and 208, the ends of a screw 206. Screw 206 is engaged by a threaded bevel gear member 209 (Figs 7 and 12) which has a pair of extending bearing portions 210 and 211 on either side thereof. Portions 210 and 211 are journaled within bushings 212 and 213 securely mounted within clamping pieces 214 and 215. Each of these clamping pieces 214 and 215 comprises a pair of semi-circular members 216 and 217 which are secured as by bolts 218 (Fig. 7) to irregularly shaped brackets 219 and 220 formed on the rear wall of the support 5. Thrust bearings 209a and 209b are provided above and below the bevel gear 209 to carry the weight of the camera and its support and also to take up the thrust imposed by the gear 209. Bevel gear 209 meshes with a second bevel gear 221 secured as by a key to the end of a shaft 224. A hand wheel 225 provided on the outer end of the shaft 224 allows for adjustment of the camera 4 in a vertical plane. Shaft 224 is journaled within a bushing 226 which is secured within a bracket 227 having a cap piece 228 mounted thereon. A thrust washer 229 is provided to take up the thrust imposed by the bevel gear 221. A counter-weight 230 is provided to counter-balance the weigth of the camera 4 and its accompanying support 5 and thus provide a smoother and easier movement thereof. A cable 231 is attached at one end to the weight 230 and is passed around a pair of pulleys 232 and 233 and is secured to the upper end of the camera support 5 in any suitable manner.

The camera 4 although of the motion picture type is preferably provided with a stop motion, not shown, which is generally used in the art of taking animated cartoon pictures. In this type of mechanism, the camera takes only one picture at a time and is actuated by a push button 234 (Fig. 2) provided on the undersurface of the table 1. Connection between the button 234 and the stop motion mechanism of the camera 4 may be made through an electric conduit 235.

Figure 18:
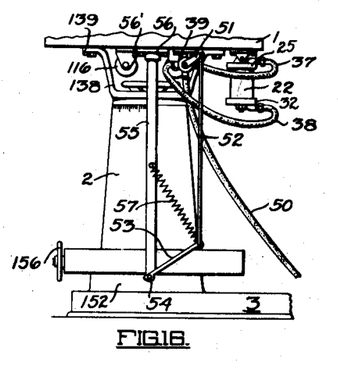
Figs. 18–21, inclusive, are diagrammatic plan views of the cartoon carrying table showing various arrangements for producing relative motion between a series of cartoons.

In the operation of the machine, a series of cartoons are secured to any of the cartoon carriers heretofore described. Any number of arrangements may be made, examples of which are shown in the diagrammatic views of Figs. 18–21, inclusive. For example, in Fig. 18, a background strip or carrier 236 may be secured by the clamping pieces 100 to the slide 62. The strip 236 in this case would be opaque and would have thereon a background scene 236' such as a landscape. A cartoon 237 having thereon an animated object 238 is formed of celluloid or other suitable transparent material and is superimposed upon the background strip 236. Cartoon 237 has a pair of registering holes 239 which are adapted to be engaged by the pins 98 provided on the slide 63. After one frame is photographed, a second cartoon depicting the next step in the action of the object 238 is placed upon the pins 98 replacing the preceding cartoon. At the same time, the slide 62 is moved a desired amount so as to show relative motion between the object 238 and the background 236'. If the object 238 is to be kept in the center of the picture, the slide 63, carrying the Celluloid cartoon 237, is allowed to remain stationary at all times. If, however, the object 238 is to be shown as passing from one side of the picture to the other, the slide 63 is moved in the proper direction relative to the background scene. Any combination of movements of the background strip and cartoon relative to each other may thus be accomplished to give a desired result to the picture.

A further combination of cartoons is illustrated in Fig. 19. In this case, the background strip or carrier 240 is secured to the slides 126 (described in connection with Fig. 15) mounted within the channels 122 and 124. A scale 128' may be provided to move the strip 240 a pre-determined amount for each photograph. A pair of celluloid cartoon sheets 242 and 243 are provided in this instance and are secured to the pins 98 and 99 of the slides 62 and 63. In this case, relative movement between two objects 245 and 246, one placed on each sheet, may be depicted and this combination may be shown as moving relative to the background 240.

Figure 20:
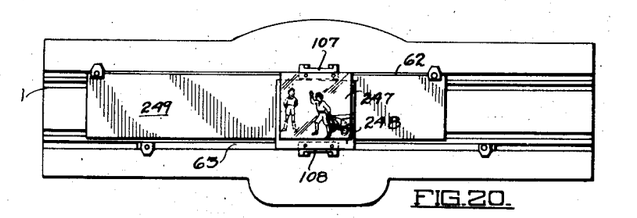

Fig. 20 shows an arrangement wherein the members 107 and 108 (Fig. 3) are used to hold the cartoons 247 and 248 in a stationary position. The background strip 249 in this case is secured to the slide 62 in a manner identical with that shown in Fig. 18. In this instance, each series of the cartoons 247 and 248 are held in the same position at all times or in other words, are held at the center of the picture while the background strip 249 may be moved relative thereto or also allowed to remain stationary.

Figure 21:
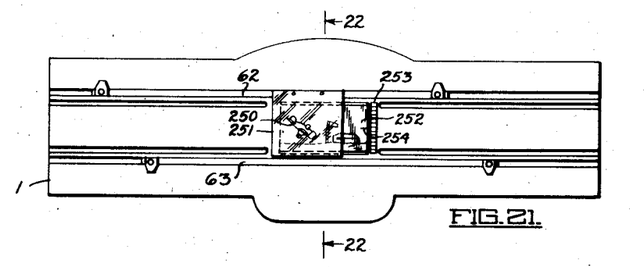
Figure 22:
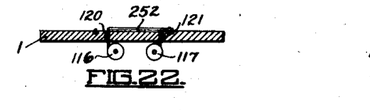
Fig. 22 is a diagrammatical section view taken along the line 22—22 of Fig. 21 showing an arrangement for moving one of the cartoons in a direction perpendicular to the movement of a second cartoon.

Figs. 21 and 22 show an arrangement wherein an object 250 provided on a cartoon 251 may be depicted as moving vertically in respect to the background strip 252. In this case, use is made of the rolls 116 and 117 (Figs. 4 and 22) on which the background strip 252 is rolled. A scale 253 is placed on the top of the table 1 at one side of the background strip or carrier 252 and is adapted to register with indexing points 254 provided along the edge of the strip 252 and thus allow a predetermined positioning of the background strip 252 to be made. By providing the cartoon 251 upon the movable slide 62, any suitable combination of movements of the cartoon 251 and background strip 252 may be provided relative to each other.

It will be understood, of course, that any number of combinations of the above noted arrangements may be utilized to provide new and pleasing results.

In the operation of the machine, light from a pair of suitable lamps 255 and 256 (Fig. 2) is focused upon the cartoons through the presser plate 7. The pedal 53 is depressed thus clamping the presser plate 7 onto the various cartoons to hold them flat and prevent halation. The button 234 is then pressed permitting one frame of the motion picture film within the camera 4 to be exposed and at the same time automatically moving a succeeding frame into photographing position. The pedal 53 is then allowed to be retracted into its original position by the spring 57 to allow the presser plate to be moved into its retracted position as shown by the dotted lines of Fig. 1. The handles 75 and 84 of the indexing arrangements 78 and 83 are then set to move the various cartoons a certain predetermined amount and other cartoons, if provided, are also moved into their next positions. The pedal 53 is again depressed and the button 234 is pressed to complete a second cycle of operation.

In the event that it is desired to photograph a cartoon at an angle as, for example, to show an object running up a hill, the table 1 is angularly adjusted on its column by unloosening the clamping screw 145 and rotating the table 1 a desired number of degrees as shown by the scale 142. The hand wheel 156 may be used to move the table laterally and thus center the cartoon in an up and down relation to the lens of the camera 4 or it may be used to show certain desired results, as, for example, to show vertical movement of the cartoons in relation to the camera.

Having thus described the invention, what is claimed as new and desired to secure by Letters Patent, is:

1. Means for obtaining substantially the same intensity of photographic exposure for different combinations of transparent sheets having pictures thereon and while maintaining a substantially constant source of illumination for said drawings comprising a support for said sheets having drawings, a movable transparent presser plate therefor, a holder for said plate, and means comprising a plurality of spring pressed plungers on each side of said holder, each of said plungers having an operating member at the top of said holder and having a sheet retaining head on the bottom of said presser plate for removably retaining a number of blank transparent sheets against said presser plate whereby the opening of said presser plate moves said blank sheets out of photographing position to permit re-arrangement of the picture sheets on said support without handling the blank sheets on said presser plate.

2. A device for supporting pictures to be photographed comprising the combination of a camera and a picture support therebelow, a transparent presser plate for said picture support, a hinge, a frame for said plate connected to said hinge, a member mounted on said hinge for swinging said presser plate, and means for operating said member to swing said plate away from said support, to press said plate towards said support, and to maintain said plate pressed against the pictures on said support during the photographing thereof, said member and said means being out of the field of view of said camera when said plate is in photographing position, and said member and said means providing access to said picture support when said plate is swung away from said support.

3. A device for supporting pictures to be photographed according to claim 2 wherein said member comprises a lever projecting away from said frame, and wherein said means comprises a fluid pressure operated device for operating said lever.

4. A device for supporting pictures to be photographed comprising a picture support, a transparent presser plate therefor, a holder for said plate, a shaft laterally spaced from said plate, bearings for said shaft, a pair of arms connected to said shaft and terminating adjacent the middle of said plate, a pivotal connection between said arms and said plate holder, a lever connected to said shaft and extending away from said plate, a pressure cylinder below the level of said picture support, a driving connection between said cylinder and said lever, and a control valve for said cylinder.

5. A device for supporting pictures to be photographed comprising the combination of a camera and a picture support therebelow, a transparent presser plate for said picture support having a front edge movable toward and away from said support and a back edge adjacent a pivotal axis, a shaft in said axis and bearings for said shaft, side members for holding said plate, a hinge member pivotally connected to each of said side members and fixed to said shaft, and means positioned adjacent the back edge of said plate for swinging said plate toward and away from said picture support and for maintaining said plate pressed against the pictures on said support during the photographing thereof.

6. Photographic apparatus comprising the combination of a bed, a column on said bed, means for transversely adjusting said column with respect to said bed, a circular bearing at the top of said column, a table support rotatably carried by said bearing, means for locking said table support to the top of said column in adjusted position, a picture table carried by said table support, and a transparent presser plate hinged to said picture table, and means independent of said column, said table support and said table for supporting a camera in photographing relation to said picture table.

7. Photographic apparatus comprising the combination of a bed, a standard and a column laterally spaced from each other and arising from said bed, a circular bearing at the top of said column, a spider rotatably mounted in said bearing, means for adjustably clamping said spider to said column, a picture support carried by said spider, a transparent presser plate at the top of said picture support, means for mounting said presser plate for movement toward and away from said picture support, a camera support, means for mounting said camera support on said standard for vertical movement, and means on said camera support for supporting a camera over said presser plate.

8. Photographic apparatus according to claim 7 comprising means below said circular bearing for transversely adjusting the position of said column.

9. A device for supporting pictures to be photographed comprising a column having a circular bearing at the top thereof, a spider rotatably carried by said bearing and having upwardly extending legs, a clamping screw passing through said spider and the top of said column and having a handle accessible through the space between said legs, a picture support mounted on said legs and a transparent presser plate at the top of said picture support.

10. A device for supporting pictures to be photographed according to claim 9, comprising spaced parallel picture strip apertures in said picture support adjacent the front and back edges respectively of said presser plate when the same is adjacent said picture support, and picture strip supply and take-up reels for said apertures and mounted below said picture support between the legs of said spider.

11. A device for supporting pictures to be photographed comprising the combination of a table, a pad thereon, a transparent presser plate, means for mounting said plate for movement to and from said pad, a channel for said table, a slide in said channel adapted to carry a picture sheet over said pad, a rack in said channel on said slide, a pinion for said rack, a handle at the front of said table, an operating connection between said handle and said pinion, a shaft for said handle, and a pair of stops individually and collectively adjustable about said shaft as a center and a co-operating stop on said handle for indexing the movement of said handle through a desired angle.

12. Photographic apparatus according to claim 6 wherein said independent means comprises a second column on said base at one side of said first column with a camera support longitudinally adjustable on said second column and comprising means for supporting a camera in photographing relation to the top of said table.

13. Photographic apparatus comprising a bed, a vertical column on said bed, means for transversely adjusting said column with respect to said bed, a circular bearing at the top of said column, a table support rotatably carried by said bearing, means for locking said table support to the top of said column in adjusted position, a horizontal picture table carried by said table support, a transparent presser plate hinged to said picture table, a second vertical column fixed to said base and arising therefrom at one side of said first column, and a camera support vertically adjustable on said second column and comprising means for supporting a camera in photographing relation to the top of said table.

ALBERT W. TONDREAU.